(12) United States Patent
Devore et al.

(10) Patent No.: US 7,600,966 B2
(45) Date of Patent: Oct. 13, 2009

(54) TURBINE AIRFOIL WITH IMPROVED COOLING

(75) Inventors: Matthew A. Devore, Manchester, CT (US); Corneil S. Paauwe, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 206 days.

(21) Appl. No.: 11/333,140

(22) Filed: Jan. 17, 2006

(65) Prior Publication Data

US 2007/0166161 A1    Jul. 19, 2007

(51) Int. Cl.
*F01D 5/18* (2006.01)
(52) U.S. Cl. .................................... 415/115; 416/97 R
(58) Field of Classification Search ............... 416/97 R; 415/115
See application file for complete search history.

(56) References Cited

U.S. PATENT DOCUMENTS

| 4,542,867 | A  |   | 9/1985  | Memmen |
| 5,392,515 | A  | * | 2/1995  | Auxier et al. .......... 29/889.721 |
| 6,000,908 | A  | * | 12/1999 | Bunker .................... 416/95 |
| 6,164,912 | A  | * | 12/2000 | Tabbita et al. .......... 416/97 R |
| 6,282,905 | B1 | * | 9/2001  | Sato et al. .................. 60/752 |
| 6,514,042 | B2 | * | 2/2003  | Kvasnak et al. ........... 416/97 R |
| 6,769,866 | B1 | * | 8/2004  | Kannefass et al. .......... 415/115 |
| 6,932,571 | B2 | * | 8/2005  | Cunha et al. .............. 416/97 R |
| 7,255,534 | B2 | * | 8/2007  | Liang ...................... 416/97 R |

OTHER PUBLICATIONS

European Search Report for EP Application No. 06255893.7, Apr. 21, 2008.

* cited by examiner

*Primary Examiner*—Ninh H Nguyen
(74) *Attorney, Agent, or Firm*—Carlson, Gaskey & Olds

(57) ABSTRACT

A turbine airfoil includes an outer wall and a plurality of cooling passages or minicores formed in the outer wall. A web separates each adjacent pair of the minicores. In order to provide more effective, even cooling of the airfoil, a baffle inside the airfoil includes a plurality of outlets aligned with the webs. The fluid outlets direct the cooling fluid directly onto the web. The cooling fluid then flows through the minicores and out through exits in the minicores.

22 Claims, 4 Drawing Sheets

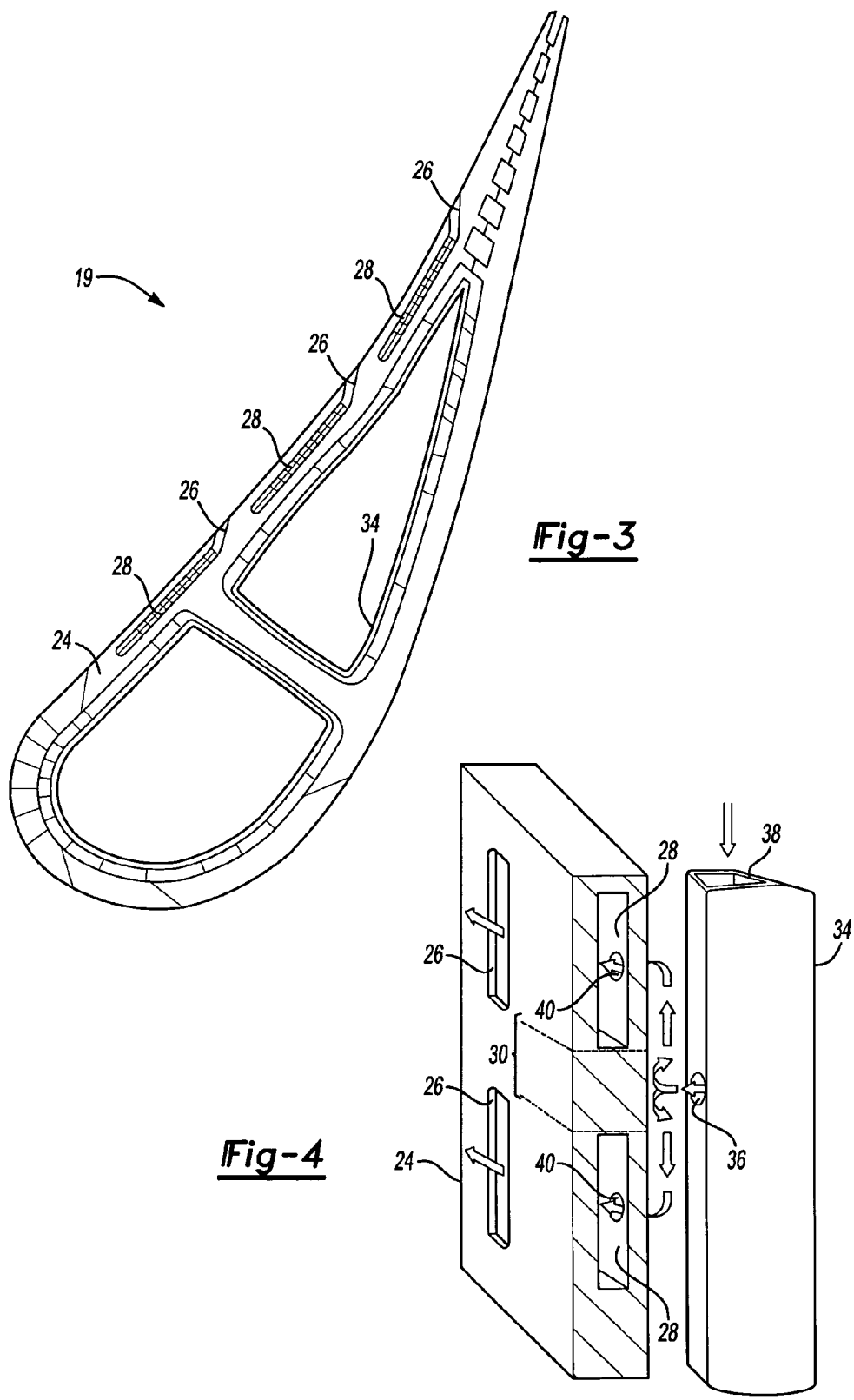

TURBINE AIRFOIL WITH IMPROVED COOLING

This invention was made with Government support under N00019-02-C-3003 awarded by the United States Navy. The Government has certain rights in this invention.

BACKGROUND OF THE INVENTION

The present invention relates generally to gas turbine engines and more particularly to cooling a turbine airfoil.

In operation, turbine airfoils are routinely exposed to temperatures well above their material limits. In existing engines, air from the compressor section of the turbine engine is used to cool the airfoil. Cast-in passages, known as minicores, are embedded in the airfoil wall to enhance convective cooling. Because of the high heat fluxes associated with these cooling circuits, large thermal gradients arise and the airfoil becomes susceptible to thermal mechanical fatigue cracking. To reduce thermal strains, a web is required between the minicores to stiffen the airfoil wall. The presence of the web, however, creates an area of lower heat flux compared to that of the adjacent minicores.

SUMMARY OF THE INVENTION

The present invention provides improved cooling to the webs between minicores in an airfoil. Thus, the airfoil of the present invention can withstand higher temperatures with less temperature-related problems.

A turbine airfoil according to a disclosed embodiment of the present invention includes an outer wall and a pair of cooling passages or minicores formed in the outer wall. A web separates the pair of cooling passages. In order to provide more effective, even cooling of the airfoil, a fluid outlet is aligned with the web. The fluid outlet directs a cooling fluid directly onto the interior surface of the web. The cooling fluid then flows through the minicores and out through exits of the minicores.

A baffle may be inserted into the airfoil to provide the fluid outlets. The baffle may include the plurality of fluid outlets arranged in a pattern to focus impingement jets on the web regions between each adjacent pair of minicores. The dimensions and spacing of the impingement outlets are such that the heat transfer coefficients generated provide a heat flux that is comparable to that achieved by the minicores. As a result, the airfoil wall has lower overall thermal gradients, which reduces thermal mechanical fatigue and increases oxidation life by lowering surface temperatures.

BRIEF DESCRIPTION OF THE DRAWINGS

Other advantages of the present invention can be understood by reference to the following detailed description when considered in connection with the accompanying drawings wherein:

FIG. 3 is a sectional view through one of the vanes of FIG. 2.

FIG. 4 is a perspective illustration showing the operation of the baffle and minicores inside the vane of FIG. 2.

DETAILED DESCRIPTION OF A PREFERRED EMBODIMENT

Figure 1:
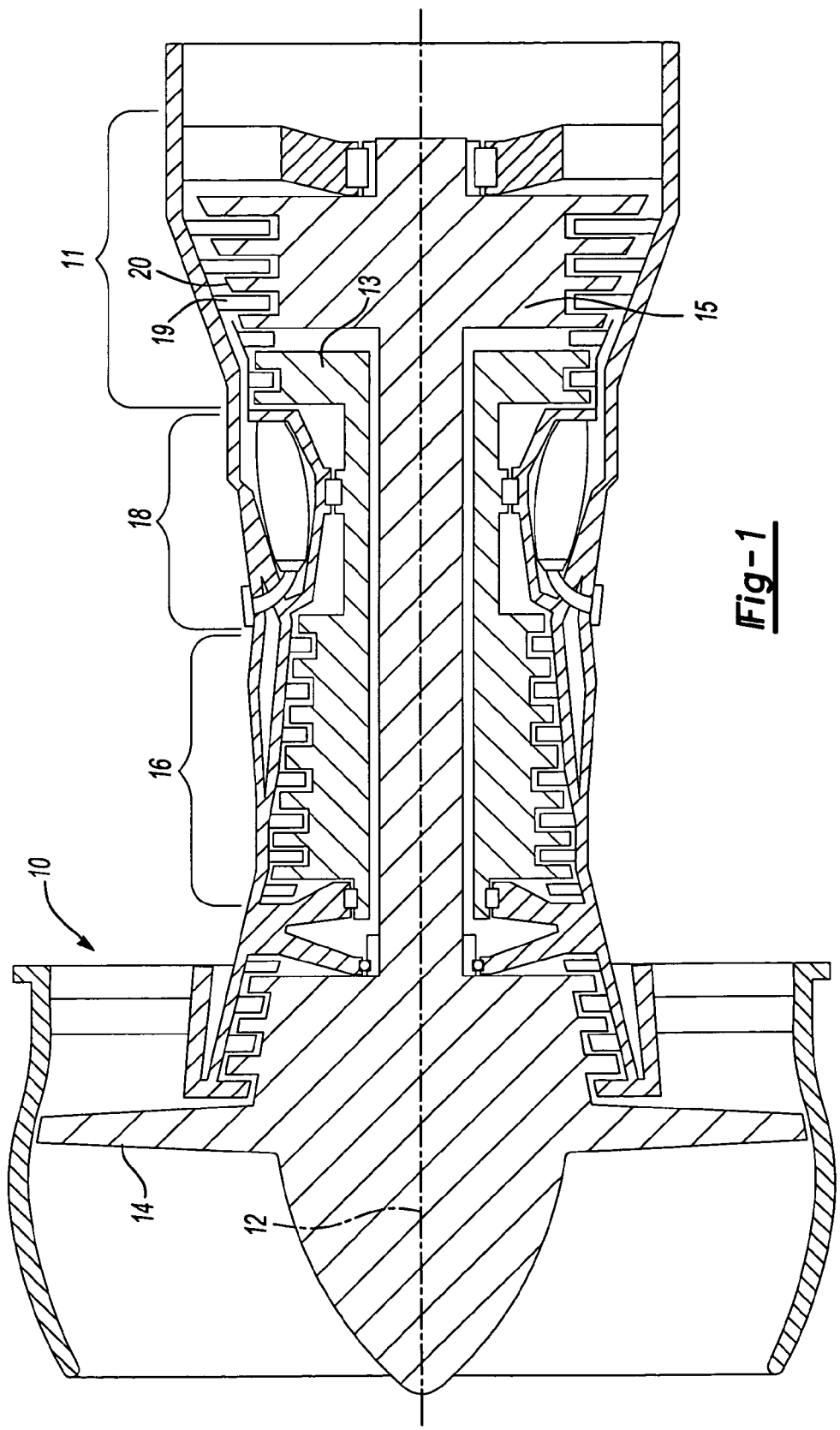
FIG. 1 is a schematic of a gas turbine engine incorporating one embodiment of an airfoil assembly of the present invention.

FIG. 1 shows a gas turbine engine 10, such as a gas turbine used for power generation or propulsion, circumferentially disposed about an engine centerline or axial centerline axis 12. The engine 10 includes a fan 14, a compressor 16, a combustion section 18 and a turbine 11. As is well known, air compressed in the compressor 16 is mixed with fuel that is burned in the combustion section 18 and expanded in turbine 11. The turbine 11 includes rotors 13 and 15 that rotate in response to the expansion, driving the compressor 16 and fan 14. The turbine 11 compresses alternating rows of turbine blades 20 and vanes 19. FIG. 1 is a somewhat schematic presentation for illustrative purposes only and is not a limitation on the instant invention, which may be employed on gas turbines for electrical power generation, aircraft, etc. Additionally, there are various types of gas turbine engines, many of which could benefit from the present invention, which is not limited to the design shown.

Figure 2:
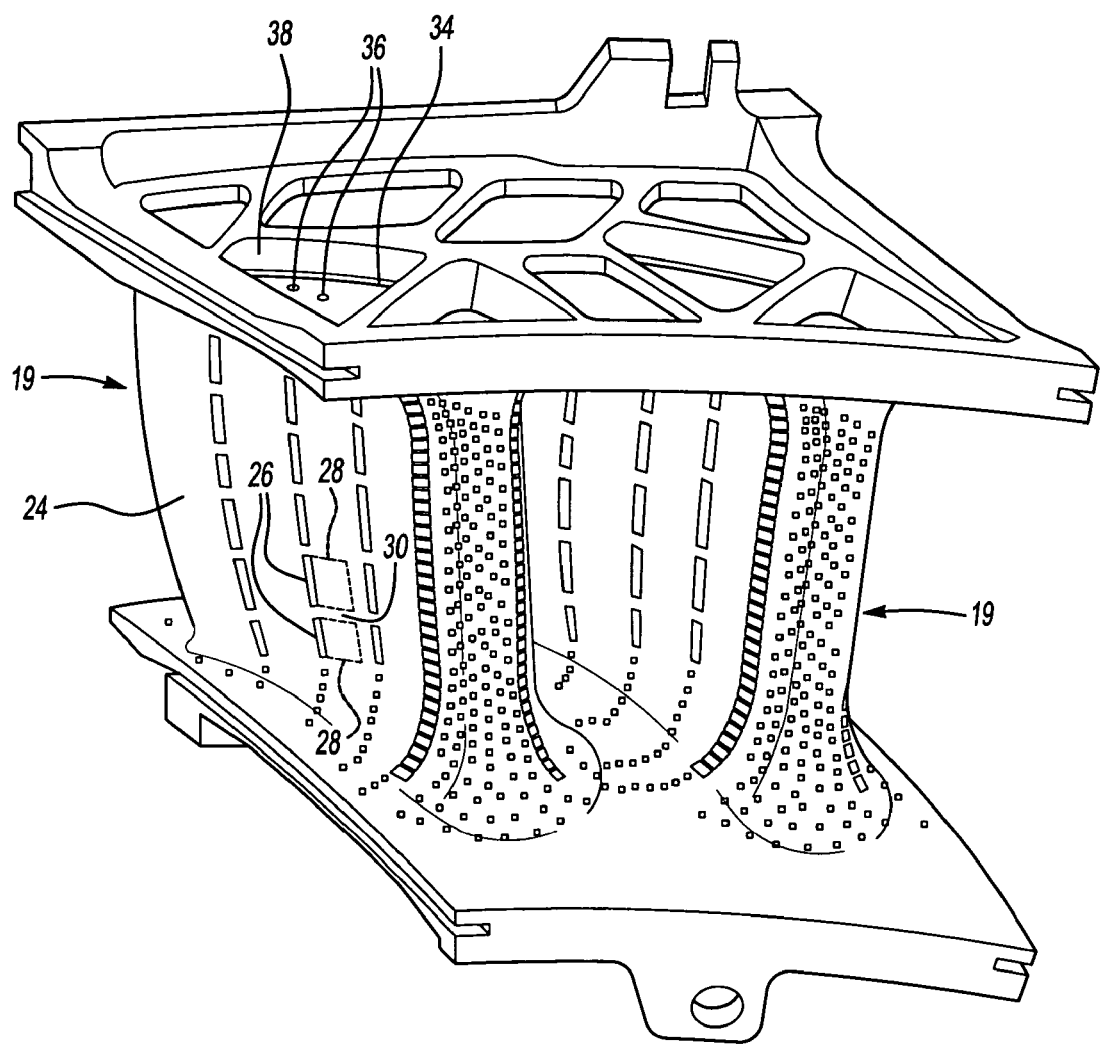
FIG. 2 is a perspective view of two turbine vanes from FIG. 1.

A pair of turbine vanes 19 are illustrated in FIG. 2. While the present invention will be described with respect to its application in a turbine vane 19, the invention could also be utilized in a rotating structure such as a turbine blade 20 (FIG. 1) and other static turbine components such as blade outer air seals, turbine exhaust cases, and struts. Additional uses of the cooling scheme may include combustor liners and flame holders as well as nozzle liners and flaps. The turbine vane 19 includes an outer wall 24 through which are formed minicore slots or exit apertures 26 for exhausting the cooling air (or other fluid) from minicores 28 formed in the outer wall 24 of the turbine vane 19. Between each pair of minicores 28 is defined a rib or web 30.

A baffle 34 having a plurality of apertures or outlets 36 formed therethrough is disposed in the turbine vane 19. The baffle 34 and the turbine vane 19 include an inlet 38 at a radial end. The outlets 36 are arranged and positioned in order to direct cooling fluid directly on the webs 30, and are sized in order to allow sufficient fluid flow to fill the minicores 28.

FIG. 3 is a sectional view through one of the vanes 19 of FIG. 2. The minicores 28 are formed in the outer wall 24 of the turbine vane 19. The baffle 34 is inside the turbine vane 19, spaced inwardly of the outer wall 24.

FIG. 4 shows, somewhat schematically, the operation of the baffle 34 and minicores 28 inside the turbine vane 19. The cooling fluid, in this example, bleed air from the compressor section 16 of the engine 10 (FIG. 1), is directed into the inlet 38 of the baffle 34. The cooling fluid is then directed from the outlets 36 through the baffle 34 directly onto the webs 30 in the outer wall 24 between the minicores 28. The cooling fluid then flows into the minicores 28 through inlet apertures 40. Inside the minicore 28, the cooling fluid flows generally parallel to an outer surface of the outer wall 24 before being exhausted through the minicore exit apertures 26. The other outlets 36 (not shown in FIG. 4) are also directed onto webs 30 between minicores 28. Although each minicore 28 is shown having a single inlet aperture 40 and a single exit aperture 26, each minicore 28 could have a plurality of inlet apertures 40 and/or a plurality of exit apertures 26.

The dimensions and spacing of the outlets 36 (one shown) are such that the heat transfer coefficients generated provide a heat flux that is comparable to that achieved by the minicores 28. As a result, the outer wall 24 has lower overall thermal gradients, which reduces thermal mechanical fatigue and increases oxidation life by lowering surface temperatures.

Figure 5:
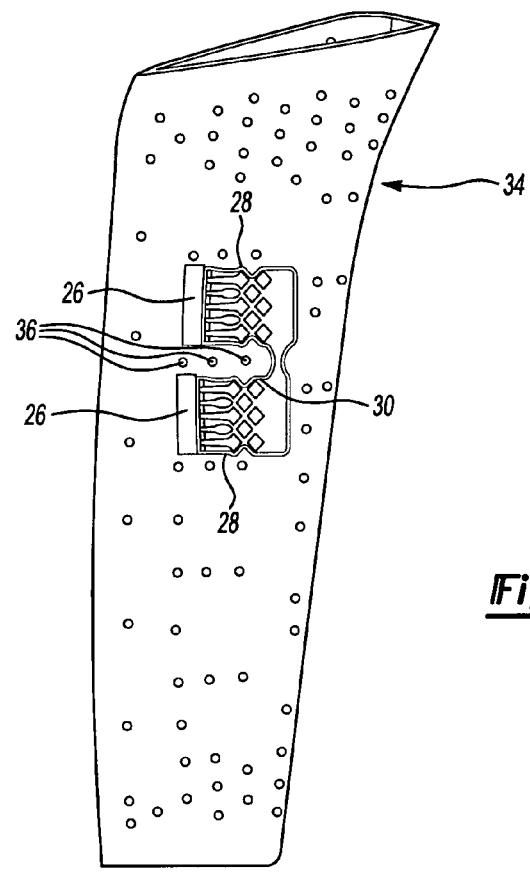
FIG. 5 is a side view of the baffle of FIG. 3, showing the arrangement of two of the minicores.

FIG. 5 illustrates the placement of two of the minicores relative to the baffle 34. As shown, the minicores 28 are positioned such that the web 30 between the minicores 28 is aligned with the outlets 36 in the baffle 34.

Figure 6:
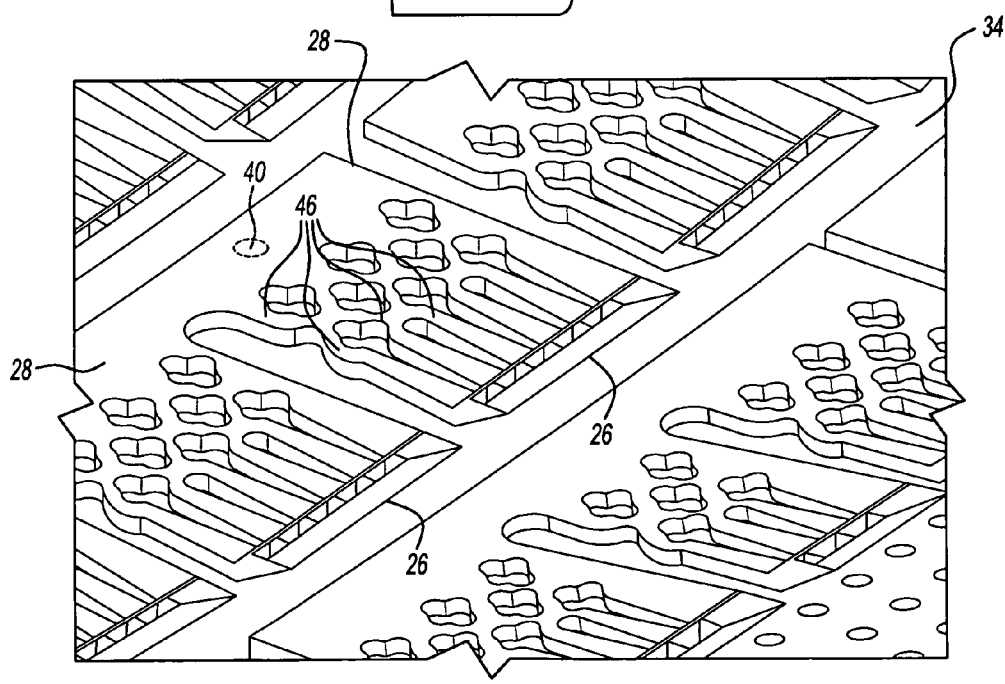
FIG. 6 is a more detailed view of the minicores that could be used in FIGS. 2-5.

FIG. 6 is a perspective view of a plurality of minicores 28 positioned adjacent (relative) to the baffle 34. As shown, each of the minicores 28 includes a plurality of passages 46 leading from the inlet apertures 40 to the exit apertures 26.

Although in the embodiment shown, the impingement of the cooling air is directed by a baffle 34, the cooling air could also be directed by an impingement plate. The impingement plate could be perforated sheet metal bonded to the airfoil casting. The cooling scheme described herein could also be used in other turbine, combustor, and nozzle components, and formed by sheet metal or a similarly functioning perforated material.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A turbine airfoil comprising:
   an outer wall;
   a pair of cooling passages formed in the outer wall, each of the pair of cooling passages having an inlet and an exit spaced downstream from the inlet, such that the inlet and the exit are not directly aligned with one another;
   a web separating the pair of cooling passages; and
   a fluid outlet aligned with the web for directing a cooling fluid onto an interior surface of the web, wherein each of the cooling passages includes an inlet in communication with the fluid outlet.

2. The turbine airfoil of claim 1 further including a baffle having a plurality of apertures formed therein, the plurality of apertures including the fluid outlet.

3. The turbine airfoil of claim 2 wherein the pair of cooling passages are two of a plurality of cooling passages formed in the outer wall, and wherein the web is one of a plurality of webs, each adjacent pair of the plurality of cooling passages separated by one of the plurality of webs.

4. The turbine airfoil of claim 3 wherein each of the plurality of apertures in the baffle are aligned with one of the plurality of webs.

5. The turbine airfoil of claim 4 wherein the baffle includes an inlet at a radial end, the plurality of apertures directed from the baffle in a direction generally transverse to the inlet.

6. The turbine airfoil of claim 1 wherein the pair of cooling passages is a minicore.

7. The turbine airfoil of claim 6 wherein the minicores each include a plurality of pedestals extending across the cooling passage.

8. The turbine airfoil of claim 1 wherein the turbine airfoil is a vane.

9. The turbine airfoil of claim 1 wherein the cooling passages exhaust through the outer wall.

10. The turbine airfoil of claim 9 wherein each of the pair of cooling passages is a minicore.

11. The turbine airfoil of claim 10 wherein the minicores each include a plurality of pedestals extending across the cooling passage.

12. The turbine airfoil of claim 1 wherein the pair of cooling passages is a first pair of cooling passages and the web is a first web and the fluid outlet is a first fluid outlet, the airfoil further including a second pair of cooling passages spaced downstream of the first pair of cooling passages, the second pair of cooling passages separated by a second web, a second fluid outlet aligned with the second web.

13. A method of cooling a turbine airfoil assembly including the steps of:
   directing a cooling fluid into an interior of a turbine airfoil;
   directing the cooling fluid onto an interior surface between a first inlet to a first cooling passage and a second inlet to a second cooling passage; and
   flowing the cooling fluid through the first cooling passage and the second cooling passage and out through a first exit and a second exit, the first exit offset downstream from the first inlet, the second exit offset downstream from the second inlet.

14. The method of claim 13 further including the step of flowing the cooling fluid out of the first cooling passage and the second cooling passage and out of the turbine airfoil.

15. The method of claim 14 further including the step of directing the cooling fluid into an inlet at a radial end of the turbine airfoil.

16. The method of claim 15 further including a plurality of ribs each separating an adjacent pair of a plurality of cooling passages including the first cooling passage and the second cooling passage, the method further including the step of directing the cooling fluid through a plurality of apertures onto the plurality of ribs.

17. The method of claim 13 further including the step of directing the cooling fluid into an inlet at a radial end of the turbine airfoil.

18. The method of claim 13 wherein the turbine airfoil is a turbine vane.

19. The method of claim 18 further including the steps of directing the cooling fluid into a baffle within the turbine airfoil.

20. The method of claim 19 further including a plurality of ribs, the method further including the step of directing the cooling fluid through a plurality of apertures through the baffle onto the plurality of ribs.

21. The method of claim 13 further including the step of directing the cooling fluid onto a rib separating the first cooling passage and a second cooling passage.

22. A turbine airfoil comprising:
   an outer wall;
   a plurality of adjacent pairs of cooling passages formed in the outer wall including a first pair of cooling passages, each of the first pair of cooling passages having an inlet and an exit, such that the inlet and the exit are not directly aligned with one another;
   a plurality of webs, each web separating one of the adjacent pair of cooling passages; and
   a baffle having a plurality of apertures formed therein, the plurality of apertures each aligned with one of the plurality of webs for directing a cooling fluid onto interior surfaces of the webs, wherein each of the cooling passages in each adjacent pair of cooling passages includes an inlet in communication with the aligned aperture.

* * * * *

UNITED STATES PATENT AND TRADEMARK OFFICE
CERTIFICATE OF CORRECTION

PATENT NO. : 7,600,966 B2
APPLICATION NO. : 11/333140
DATED : October 13, 2009
INVENTOR(S) : Devore et al.

Page 1 of 1

It is certified that error appears in the above-identified patent and that said Letters Patent is hereby corrected as shown below:

In the Claims:

Claim 6, column 3, line 51: insert --each of-- after "wherein"

Signed and Sealed this

Eighth Day of December, 2009

David J. Kappos
*Director of the United States Patent and Trademark Office*